Patented Mar. 16, 1943

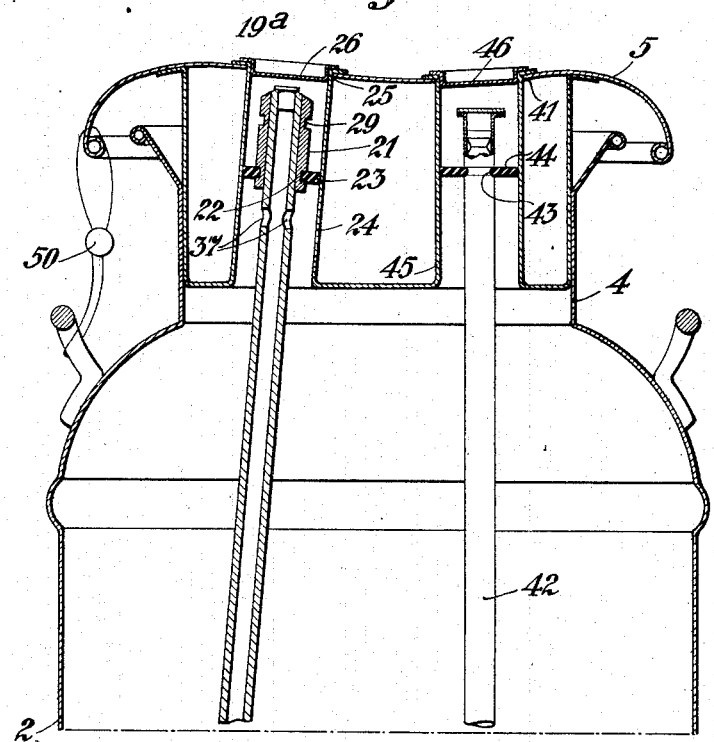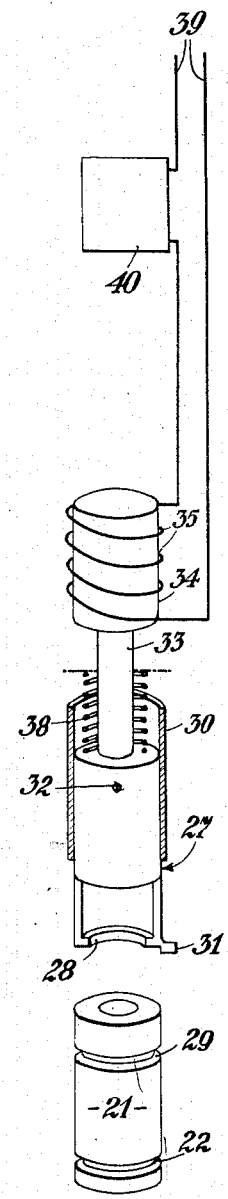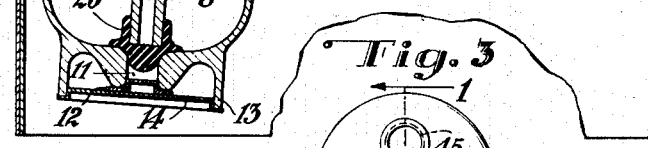

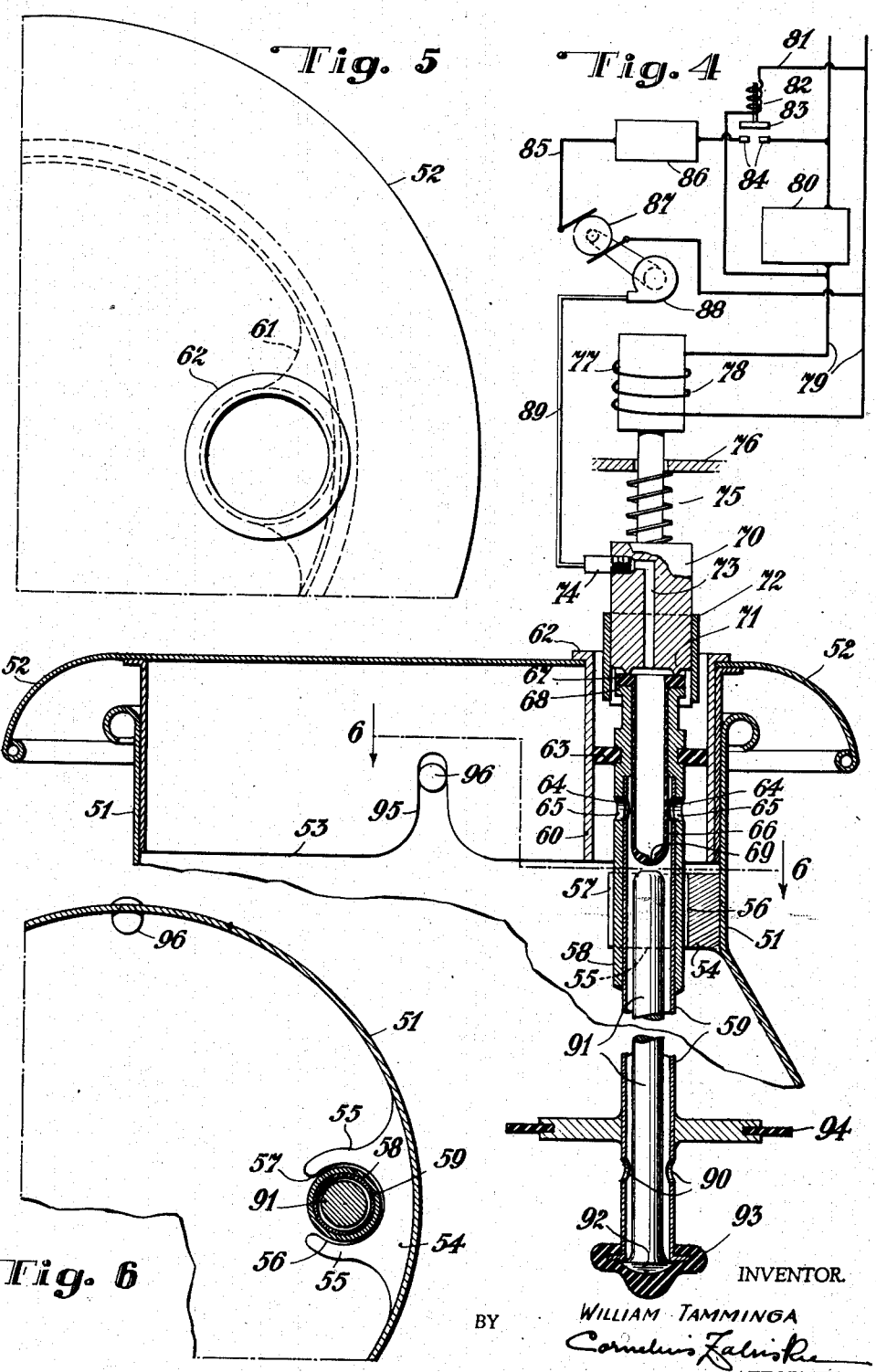

2,313,846

UNITED STATES PATENT OFFICE 2,313,846

DISPENSING DEVICE

William Tamminga, Bronx, N. Y., assignor to Monitor Process Corporation, Jersey City, N. J., a corporation of New Jersey Application October 24, 1939, Serial No. 300,919

20 Claims. (Cl. 221—67)

This invention is a dispensing device and is directed more particularly to the dispensing of milk from milk delivery cans wherein milk may be shipped in bulk to a retailer and dispensed by the latter in relatively small measured quantities, preferably by the glass. Much bulk milk is sold in this way and numerous dispensing devices have been suggested for use in this connection. The requirements for such a device, however, are strict, because the milk must be kept in a clean and sterile condition and free from pollution of any kind.

My experience has shown that the only satisfactory way to insure safe retail distribution of milk is to provide dispensing means wherein all parts thereof, which come in contact with the milk, are susceptible of cleaning and sterilization at the creamery and before the milk is introduced into the can, so that when the can is shipped, the dispensing mechanism forms an inherent part of the package, to the extent that all parts which contact with the milk are shipped with it. With this practice, the retail dealer is not required to maintain any of these parts clean for experience has shown that retail dealers are apt to become careless and fail to carry out the necessary safeguards in this direction. The can of the present invention is patterned along these lines and provides for the dispensing of milk through the bottom of the can in measured quantities and through the employment of operating means acting through an opening in the top of the can.

More specifically, the present invention, in one of its preferred forms, comprises a milk delivery can which is, in the main, of substantially conventional construction, the same being provided with the usual body and neck and with a removable cover. Associated with the bottom of the body is a measuring chamber having an inlet at its top and an outlet at its bottom and with said inlet and outlet, cooperate tandem valves, so organized that, when the inlet is opened, the outlet is closed and vice versa. The tandem valves have a common tubular valve stem extending for substantially the full height of the can and mounted for sliding movement in an appropriate guide mounted on the inside of the can cover. The guide is adapted to be normally sealed when the can is filled and shipped with milk, while the outlet of the measuring chamber is similarly sealed during shipment. When the can is received by the retailer these seals are removed and an appropriate operating member, hereinafter more fully described, is coupled to the upper end of the valve stem and may be operated manually, mechanically, or electrically to actuate the valves simultaneously, for the purpose of dispensing measured quantities of milk as and when desired.

An important feature of this invention resides in the fact that the measuring chamber to which the milk is dispensed is vented to the interior of the can above the surface of the milk in the can body by way of the tubular valve stem. This fact permits the measuring chamber to readily fill without trapping air therein and to be readily discharged with a nice even flow and without a production of subatmospheric pressures which would interfere with the dispensing operation.

Features of the invention, other than those specified, will be apparent from the hereinafter detailed description and claims, when read in conjunction with the accompanying drawings.

The drawings illustrate different practical embodiments of the invention, but the constructions therein shown are to be understood as illustrative, only, and not as defining the limits of the invention.

Figure 1 is a central vertical section through a milk delivery can embodying the present invention, as the parts appear when the can is filled with milk and ready for shipment. This section is taken in the plane of the line 1—1 of Fig. 3.

Figure 2 shows the valve operating means, more or less diagrammatically, so that one manner of operating the tandem valves may be clearly understood.

Figure 3 is a plan view of the cover of the can.

Figure 4 is a fragmental vertical section of a can embodying a modified form of the invention.

Figure 5 is a plan view of one-half of the cover.

Figure 6 is a section on the line 6—6 of Figure 4 taken through the neck of the can with the cover removed.

Referring to the drawings, 1 designates a milk delivery can comprising a body 2, having a bottom 3, neck 4 and a cover 5. These parts are substantially conventional and their structure may vary without departing from the invention.

The bottom 3 is provided, preferably off center, although this is not essential, with an opening 6 and registering with this opening is a measuring cup 7 provided interiorly with a measuring chamber 8. The measuring cup is secured to the bottom 3 by rivets 9 or soldering, or both, to provide leak-proof joints between them and firmly attach them to one another. This measuring cup is shown as a casting, although it may be made of a stamping of one or more parts as may be desired. Its open top constitutes an inlet 10, while, at its bottom, it is provided with a central neck forming an outlet 11 adapted to be closed for shipment by any suitable and appropriate removable seal 12. The measuring cup also has a depending peripheral flange 13 which serves to protect the outlet neck and in this flange an additional removable seal 14 may be associated if desired.

It will be noted that the upper portion of the measuring cup is drawn in or contracted to form, at 15, a valve seat adapted to cooperate with a resilient ring valve 16, preferably of rubber adapted to be sprung into the peripheral channel 17 of a hub 18. This hub is supported upon a tubular stem 19 which extends for the greater portion of the height of the can. On the lower end of the stem 19 is detachably affixed a suitable valve 20, preferably of rubber, and shaped to cooperate with the outlet 11. This valve 20 and the valve ring 16 constitute tandem valves. They are spaced apart on the common valve stem 19 and the spacing is such that, when the valve 20 is seated, the valve 16 is unseated and vice versa. Thus, when the parts are in the positions shown in Figure 1, milk is free to run from the body 2 of the can into the measuring chamber 8, but is precluded from exit through the outlet 11 by the valve 20.

Rigidly secured to the upper end of the valve stem is a tubular fitting 21 shown also in Figure 2. This tubular fitting is provided near its bottom with an annular channel 22 into which is sprung a rubber ring 23 adapted to bear against and have a close sliding fit with a tubular guide 24, extending through and firmly fixed to the margins of an opening 25 in the top 5 of the can. The rubber ring 23 seals the opening through the guide 24, against the entrance of foreign matter into the can and at the same time guides the valve stem for vertical reciprocation. During shipment the top of the guide 24 is closed by a removable seal 26 and thus, when the cover is on the can and the seals 26, 12, and 14 are in place, the can is completely sealed against the entrance of any foreign matter. This is the condition of the parts, when they are shipped from the creamery with the can full of milk. The top of the valve stem is closed by a plug 19a at all times except when it is removed for cleaning at the creamery.

When the can is received by the retailer the seals are first removed and there is secured to the fitting 21 any appropriate mechanism for operating the valve stem. A wide variety of devices may be used in this connection, but in Figure 2, I have illustrated one form well adapted for electrical operation. The operating device as shown in this figure comprises a clutching member 27, the lower end of which is hollowed out and cut away so as to provide a substantially semicircular flange 28 which may be inserted into the upper end of the guide 24, off center of the fitting 21, and then moved radially inward of the fitting until the flange engages with cylindrical channel 29 formed in the fitting. When this relationship has been established, a sliding sleeve 30 is adapted to be lowered over the coupling member 27 until it rests upon a stop 31 on the latter and, when in this position, the sleeve 30 will maintain the coupling member and the fitting 21 in substantially coaxial relation and preclude disengagement of the flange 28 from the annular channel 29.

An operating member of any appropriate kind may be secured to the coupling 27, so that, when the latter is operated, it will reciprocate the valve stem. For the purpose of illustration, I have shown the fitting as secured by a pin 32 to the stem 33 of a solenoid having a core 34 and a winding 35. The parts are so related that, when the coil 35 of the solenoid is energized, it will raise the coupling together with a valve stem 19, to such an extent as to unseat the valve 20 and seat the valve ring 16, as indicated in dotted lines in Figure 1, so that milk within the measuring chamber 8 may flow through the outlet 11, while milk within the can body is precluded from entering the measuring chamber. When the solenoid 35 is de-energized, the parts will descend by gravity to return the valves to the full line position of Figure 1, although, if desired, gravity may be assisted by means of a spring 38 bearing upon the upper end of the coupling 27 as shown. When the valve 16 is unsealed milk will flow into the measuring chamber and be retained therein by the valve 20.

It will be noted that the valve stem has a vent opening 36 below the hub 18 and another vent opening 37, just below the guide ring 23 and air can freely flow through these openings and through the passage of the hollow valve stem to equalize pressures and thus preclude the trapping of air or milk in the measuring chamber during the filling or discharge thereof.

It is desirable that the operations of the solenoid be timed, so that, when the outlet valve is opened and the inlet valve closed, the solenoid will remain energized for a sufficient period to permit all of the milk to flow out of the measuring chamber before the positions of the valves are changed. Likewise, after the valves have been returned to the full line positions of Figure 1, it is essential that sufficient time lapse before another dispensing operation to permit the measuring chamber to fill up with milk. Consequently, I preferably incorporate in the circuit 39 which serves to energize the coil 35 of the solenoid, an appropriate timing device 40 of any suitable and conventional form, which will serve to maintain the circuit through the solenoid for a predetermined period after it has been established and will preclude the re-energizing of the solenoid for a predetermined period after it has de-energized. I do not consider it necessary to show any particular timing device in detail because several are well known for controlling electric circuits in any desired way.

The initiation of operation of the circuit 39 may be accomplished in any desired way, as by a push button, or by coil controlled mechanism or in any other appropriate manner without departing from this invention.

I have referred in some detail to the electrical operation of the valves through manipulation of the coupling member 27, in the manner described, but it will be understood that if so desired, the coupling member may be grasped by hand or provided with a suitable handle to be optionally grasped by hand for the purpose of directly manipulating the parts in a purely manual manner.

It is important in the retail distribution of milk that appropriate means be provided for agitating the milk from time to time, so that the cream, which normally tends to stratify, may be uniformly distributed throughout the milk body and thus assure an equitable distribution of the cream in each glass of milk dispensed. Various means may be provided for accomplishing this result, but in accordance with the present invention, I preferably employ air agitation for this purpose. This air is adapted to be admitted into the can through an opening in the top thereof and conveyed downwardly to the bottom of the can through an opening 41 in the top thereof and conveyed downwardly through a tube 42 to the bottom of the can. This tube is provided near its upper end with a circumferential channel 43 in which is sprung a packing ring 44 adapted to freely slide in a tubular guide 45 which is like the guide 24 and is secured to the opening 41 in the can cover in the same manner. The opening in the top of the guide is adapted to be normally closed by a removable seal 46, which, when removed, permits free access to the upper end of the air agitation tube 42. This air may be supplied from a flexible tubing adapted to be coupled to the upper end of the tube 42 or terminating in a rubber plug adapted to be pressed into the upper end of the tube 42. The flexible tubing communicates with a suitable source of air under pressure which, when admitted into the tube 42 is forced downwardly through the tube and out of the bottom thereof and bubbles up through the milk to agitate the same.

If desired, the upper end of the tube 42 may be equipped with any suitable check valve, for example, such as is shown in Figure 8 of my copending application, Serial No. 241,899, but this is not necessary.

It will be noted in Figure 3 that the can cover is provided with an additional opening 47 and constitutes the filling opening. This filling opening is adapted to be normally closed by a removable seal 48 made like the seals 26 and 46.

An important feature of the present invention resides in the ease of assembly of the parts, the simplicity of this structure, its mode of operation and the fact that said parts can be efficiently and easily cleaned and sterilized. When a can has been emptied and is returned to the creamery, the seals of course have been removed. To clean and sterilize the parts the following operations are carried out:

The cover is lifted off of the can carrying with it the guide 24 and the guide 45. The operator then reaches into the can, lifts out the tube 42 and then grasps the valve stem 19 and pulls it out of the can for the ring valve 16 is sufficiently resilient to permit it to be drawn through the constricted opening at the top of the measuring chamber when sufficient force is applied. In this way the valve stem and the valves are bodily removed from the can. The rubber ring 44 may then be removed and replaced if necessary and a brush may be passed through the tube 42 to thoroughly clean it. The rubber parts 16, 20 and 23 may likewise be removed and replaced with reference to the valve stem 19, if necessary. The plug 19a is removed and a brush or wiper is then passed through the tubular valve stem 19 to clean out any impurities therefrom. All of the parts associated with the valve stem, as well as the tube 42, are now thoroughly washed and cleaned, while in this dismantled condition.

After thorough cleaning the rubber parts 16, 20 and 23 are re-assembled with respect to the valve stem and these assembled parts are introduced into the can to partake of the positions shown in Figure 1. The cover is then put on to the can. Next the tube 42 is introduced into the can through the guide 45. The can is then placed in a sterilizer and live steam admitted through the filling opening. 47 and serves to thoroughly sterilize all parts of the structure simultaneously. The bottom seals 12 and 14 are next applied. A new plug is then inserted into the top of the valve stem, the seals 26 and 46 are next applied and milk is then introduced into the can through the filling opening so that the can is thereby filled. The seal 48 is next applied to the filling opening and thereafter the disruptable seal, indicated at 50, is applied between the cover and the handle of the can, so as to safeguard the can against tampering during shipping. The can filled with milk is now ready for shipment to be delivered to the retailer with all parts, which then or thereafter may come in contact with the milk, in a thoroughly clean, sterile condition.

When the retailer receives the filled can, he removes the seals 12, 14, 26 and 46, couples the air agitation tube to the tube 42 and connects the coupling member 27 to the coupling member 21 of the valve stem, and the parts are then ready for the retail dispensing of milk.

I have referred to the use of two seals 12 and 14 at the bottom of the dispensing chamber. In practice, however, either one of these seals may be used to the exclusion of the other without departing from the invention, and the seal 14 may, if desired, be so constituted that, when it is mounted on the flange 13, it will bear against the outer end of the outlet passage 11 to simultaneously serve as a seal therefor.

In Figures 4–6, I have shown a modified form of the invention. In Figure 4, the entire body of the can is broken away, so as to illustrate merely the neck of the can with the cover thereon and with the present invention associated with these parts of the can. A valve stem, however, is illustrated in section throughout but an intermediate portion of its length is broken away. In these figures, 51 designates the neck of the can, 52 the cover having the usual skirt 53 adapted to extend down into the neck of the can when in seated position. Positioned on the inside of the neck below the lower edge of the skirt of the cover is a bracket 54 which is soldered or welded in place and of the shape shown best in Figure 6, so that there are no corners or crevices in which impurities may lodge. This bracket is rigid with the neck of the can and it is provided in spaced relation to the side of the can with a pair of inwardly facing jaws 55, forming between them a substantially cylindrical passage 56 having an open side 57. The diameter of the passage is such as to have a close sliding engagement with the fitting 58 fixed on the upper end of the tubular valve stem 59, while the width of the opening 57 is substantially equal to or slightly greater than the diameter of the valve stem proper.

When the cover is off of the can, the valve stem may be introduced edgewise through the disk 57 into the passage 56 and when said valve stem is lowered the fitting 58 will substantially fill up the passage 55 and be too large to move laterally out through the opening 57, and thus the valve stem will be held in place while permitting of vertical movement thereof.

Within the cover is mounted a guide 60. This guide has a hollow cylindrical interior, but it is provided with fillets 61, as shown in Figure 5, so as not to leave corners in which impurities can accumulate. This guide is permanently soldered, welded or otherwise secured to the inner face of the skirt 53 and it has a neck extending through a circular perforation in the top of the cover, and above this perforation the neck is flanged over as shown at 62 to form a tight joint with the cover.

The fitting 58 is of somewhat smaller diameter than the guide and an elastic filler ring 63 is interposed between them and is adapted to form a tight joint to protect the can against the entrance of impurities at this point. The upper portion of the valve stem 59 is provided with a vent opening 64 and the fitting has a registering vent opening 65. These openings function in the same manner as the vent opening 37 hereinbefore described, with the exception that the opening 64 and 65 are valved. This is accomplished by means of an elastic tubular nipple 66 provided at its upper end with a flange 67 resting on a flange 68 at the top of the fitting 58 and from the elastic flange 67 the nipple is formed with an integral thin tubular wall provided with a thickened bottom having therein a slit 69 as best shown in Figure 4. The nipple fits into the upper end of the valve stem in such manner as to normally be free from the wall thereof, so that air may pass longitudinally through the valve stem and in and out through the openings 64 and 65 for venting purposes as will be understood. The purpose of the nipple valve, however, is to permit of the use of air agitation directly through the tubular valve stem and this is accomplished in the manner next to be described.

The opening in the top of the guide 60 is normally closed by a seal similar to the seal 26, but this seal is adapted to be removed for the dispensing of milk. Any appropriate dispensing means may be used in this connection, but, in Figure 4, mechanism is diagrammatically shown for accomplishing this result. This mechanism is similar to that shown in Figure 2, but with certain differences as will presently appear.

The dispensing mechanism comprises a fitting 70, very similar to the fitting 27, but provided with an annular bead 71 adapted to seat upon the elastic flange 67 of the valve nipple and when the fitting is engaged with the flanges 67 and 68, as shown in Figure 4, the fitting 70 is adapted to be held in place by a sleeve 72 functioning in the same manner as the sleeve 30. The fitting 70 has a passage 73 therethrough to a connection 74 for compressed air and a spring 75 is interposed between a suitable abutment 76 and the top of the fitting 70 to normally depress the valve stem.

Secured to the fitting is the core 77 of a solenoid, the coil 78 of which is included in a circuit 79 having a suitable source of power and including a timing device 80, corresponding to the timing device 40 in its function and mode of operation. These timing devices preferably include a switch either manually or coin controlled for initiating the energizing of the solenoid.

Shunted across the timing device 80 is a shunt circuit 81 including a magnet operated switch 82, which, when energized, lifts the bridge piece 83 free from engagement with the contacts 84 included in a circuit 85. This circuit is energized from the main leads of the circuit 78, as shown, and includes a timing device 86 and a motor 87. The timing device 86 is of any simple, conventional form, which will complete a circuit for a predetermined period and then break that circuit for a predetermined period, so that if the circuit 85 is otherwise closed, the motor 87 will be periodically operated for predetermined time periods.

The motor 87 drives a pump 88 and this pump is connected through a conduit 89 to the compressed air inlet 74 of the fitting 70.

With this arrangement and assuming that the magnet switch 82 is de-energized, the bridge piece 83 will close the circuit to the timing device 86 and this device will function periodically to supply air under pressure to the passage 73 and to the interior of the nipple 66. When the interior of this nipple is subjected to air under pressure, it will be expanded to close vent openings 64 and 65, while the slit 69 will open and admit compressed air into the valve stem, so that such compressed air will flow downwardly through the valve stem 59 and out through the lower vent opening 90 therein into the dispensing chamber which in this construction is the same as in the construction of Figure 1. This compressed air will bubble up through the contents of the can to agitate the milk therein and assure a thorough distribution of the cream throughout such milk.

It is of course essential that the tubular portion of the nipple valve expand to close the vent openings 64 and 65 before the slit 69 of said valve opens, otherwise the compressed air for agitation would merely escape through these vent openings without passing through and agitating the milk. It is therefore necessary to make the straight cylindrical wall of the nipple valve relatively thin and to make the bottom of the tube, wherein the slit is formed, relatively thick, so as to hold back the pressure in the nipple valve sufficiently to expand the cylindrical wall of the tube laterally to close the vent openings before the slit opens. This thickening of the bottom or slit end of the tube is clearly shown in Figure 4 and the thickening entirely surrounds the slit so as to insure the building up of the back pressure necessary. The thickening of the wall is interiorly of the tube. This is necessary because the nipple valve must extend into a cylindrical tube and if attempt were made to thicken it externally, it would not properly fit into the cylindrical tube 59 to effectually cooperate with the vent openings thereof under the relatively light pressures employed.

The air agitation will function as described until it is desired to dispense milk. During dispensing operations, however, it is desirable that the air agitation cease, so as not to interfere with an even flow of milk through the outlet of the dispensing chamber.

According to the wiring diagram of Figure 4, the introduction of air for agitating purposes is automatically discontinued when the circuit 79 is energized for when this occurs, the shunt circuit 81 will be energized, and the bridge pieces 83 will be lifted from the contacts 84, thus breaking the circuit to the motor 87 and rendering the air pump 88 inoperative. When no compressed air is being forced into the can, the valve nipple 66 will leave the vent openings 64 and 65 open, and the dispensing chamber will thus be vented in such manner as to permit the free flow of liquid therefrom.

It is desirable in practice to have the tubular valve stem of minimum liquid capacity, so that the quantity of milk dispensed will not vary as the height of the liquid level in the can varies. Consequently, I preferably position within the tubular valve stem 59 a filler rod 91 which substantially fills the interior of the valve stem, but leaves sufficient space between these parts for the passage of air therebetween for venting purposes. This rod may be positioned loosely within the valve stem, but I preferably provide the rod at its lower end with a flange 92 adapted to be clamped against the lower end of the valve stem by the outlet valve 93 and this valve holds the rod in place so that when the can is inverted to sterilize it, the rod will not fall out.

When an empty can, constructed as shown in Figs. 4–6 is received at the creamery for re-filling, the cover of the can is first removed, the valve stem lifted out as before, and the parts thoroughly cleaned, while in dismantled condition. To accomplish this the filler ring 63 and the nipple valve may be removed from the upper end of the valve stem and when the outlet valve 93 is removed the filler rod 91 may be withdrawn from said valve stem. The inlet valve 94 may also be withdrawn as before.

After the parts have been thoroughly cleaned, the movable parts associated with the valve stem are returned to operative positions or new ones replaced, as desired, and the valve stem and its adjuncts are returned to position in the can. The can may then be inverted in appropriate sterilizing apparatus and thoroughly sterilized with the parts in place and the can cover may also be sterilized in conventional sterilizing apparatus. After this has been accomplished, the opening in the can cover is provided with an appropriate seal, the can is then filled with milk and the cover is placed on the can. To insure axial relation between the guide 60 and the valve stem, the skirt of the cover may have a guide slot 95 adapted to coact with a pin 96 extending from the inner face of the neck of the can and so placed that the cover can only be applied in correct position. After the cover has been applied as stated, a seal similar to the seal 50 is applied and the can is ready for shipment. When received by the retailer, he removes the seal from the upper end of the guide 60 and applies the dispensing mechanism in the manner shown in Figure 4.

I have shown in Figures 4 and 5 a very satisfactory method of operating and controlling the dispensing of liquid, such as would be appropriate for use in connection with coin controlled systems with associated air agitation. I wish it understood, however, that the can and cover construction shown in Figures 4–6 may be operated in other ways, without departing from this invention and without the control of air for agitation is not necessarily limited to the showing in the accompanying drawings.

The foregoing detailed description sets forth the invention in its preferred practical form, but the invention is to be understood as fully commensurate with the appended claims.

Having thus fully described the invention, what I claim as new and desire to secure by Letters Patent is:

1. In an assembly of the character described, a milk delivery can having a body and a removable cover and provided in both the bottom of the body and in the cover with openings, a measuring receptacle rigid with the can bottom and registering with the opening thereon and provided with an inlet communicating with the interior of the can and an outlet to the exterior of the can, a pair of tandem valves respectively associated with said inlet and outlet and so arranged that, when one is in sealing position, the other is in unsealing position and vice versa, a valve stem common to both tandem valves and extending upwardly and terminating within the can and near the top of the can, a valve stem guide on the can cover interiorly of the can, and seals for closing the opening in the can cover and the outlet of the measuring receptacle when the can is shipped with milk therein.

2. In an assembly of the character described, a milk delivery can having a body and a removable cover and provided in both the bottom of the body and in the cover with openings, a measuring receptacle rigid with the can bottom and registering with the opening thereon and provided with an inlet communicating with the interior of the can and an outlet to the exterior of the can, a pair of tandem valves respectively associated with said inlet and outlet and so arranged that, when one is in sealing position, the other is in unsealing position and vice versa, a valve stem common to both tandem valves and extending upwardly and terminating within the can and near the top of the can, said valve stem being tubular and having an opening through the wall thereof between the tandem valves and another opening in the wall thereof near its upper end to permit the passage of air through the valve stem from the measuring receptacle to the upper portion of the interior of the can and vice versa, and a valve stem guide in the upper portion of the can and mounted on the cover thereof.

3. In an assembly of the character described a milk delivery can having a body and a removable cover and provided in the bottom of the body with an opening, a measuring receptacle rigid with the can bottom and registering with the opening therein and provided with an inlet communicating with the interior of the can and with an outlet to the exterior of the can, valve seats associated with said inlet and outlet, a pair of tandem valves positioned between said valve seats and respectively cooperable therewith to engage with one seat when disengaged with the other and vice versa, a valve stem common to both valves and extending upwardly and terminating within the can and near the top of the can, means in the upper portion of the can for guiding the valve stem for reciprocating movement, the can cover being provided with an opening alined with the valve stem and through which opening access may be had to the valve stem for operating the same, and means for normally sealing the opening in the can cover.

4. In an assembly of the character described, a milk delivery can having a body and a removable cover, a measuring receptacle mounted at the bottom of the can and having an inlet to the interior of the can and an outlet to the exterior thereof, opposed valve seats associated with the inlet and the outlet, tandem valves interposed between said valve seats and so positioned that when one valve is seated the other valve is unseated and vice versa, a tubular valve stem common to said tandem valves and extending upwardly to the upper portion of the can and terminating within the can, the wall of the valve stem having vent openings between the tandem valves and near its upper end, a guide in the upper portion of the can to guide the valve stem for reciprocation, there being an opening in the can cover through which access may be had to the valve stem for the purpose of operating it, and a detachable seal normally closing the opening in the can cover.

5. In an assembly of the character described, a milk delivery can having a body and a removable cover and provided in both the bottom of the body and in the cover with openings, a measuring receptacle rigid with the can bottom and registering with the opening thereon and provided with an inlet communicating with the interior of the can and an outlet to the exterior of the can, a pair of tandem valves respectively associated with said inlet and outlet and so arranged that, when one is in sealing position, the other is in unsealing position and vice versa, a tubular valve stem common to both tandem valves and extending upwardly to near the top of the can, a tubular valve stem guide mounted at the opening of and supported on the can cover and depending into the can to loosely embrace the upper end portion of the valve stem, a packing ring interposed between the valve stem and the tubular guide to form a sealed joint between them and permit longitudinal movement of the valve stem, and a removable seal normally closing the opening in the can cover and covering the upper end of the valve stem.

6. In an assembly of the character described, a milk delivery can having a body and a removable cover, a measuring receptacle at the bottom of the can provided with an inlet communicating with the interior of the can and an outlet communicating with the exterior of the can with opposing valve seats at said inlet and outlet, a pair of tandem valves positioned between said valve seats and operable respectively to engage with one seat when the other seat is disengaged and vice versa, a valve stem common to said tandem valves and extending upwardly to the upper portion of the can and terminating within the can, a guide in the upper portion of the can for the valve stem, the cover of the can having an opening through which access may be had to the valve stem for the purpose of operating the same, a removable seal normally sealing the opening in the can cover above the upper end of the valve stem, a removable seal for normally sealing the outlet of the measuring receptacle, said measuring receptacle having a depending flange around the outlet thereof to guard the latter against injury.

7. A milk delivery can cover having spaced apart inner and outer walls provided therein with aligned openings, a valve stem guide extending between and rigid with said walls and juxtaposed with the openings therein, and a detachable seal closing the opening in the outer wall.

8. A milk delivery can cover having spaced apart inner and outer walls provided therein with aligned openings, a valve stem guide extending between and rigid with said walls and juxtaposed with the openings therein, and a detachable seal closing the opening in the outer wall, said seal being removable from the exterior of the cover.

9. In an assembly of the character described, a milk delivery can comprising a body having a removable cover, a measuring receptacle at the bottom of the can, valvular means for controlling the passage of milk in measured quantities through the measuring receptacle and having a valve stem extending upwardly interiorly of the can to a point near the top of the can, a fitting mounted on the upper end of the valve stem, there being an opening in the can cover juxtaposed with the upper end of the valve stem, and valve operating means including a clutching member extending through the opening in the can cover and detachably engaging with the fitting of the valve stem to lock said stem to said valve operating means.

10. In an assembly of the character described, a milk can comprising a body having a removable cover, a measuring receptacle at the bottom of the can, valvular means for controlling the passage of milk in measured quantities through the measuring receptacle and having a valve stem extending upwardly interiorly of the can to a point near the top of the can, the can cover being provided adjacent the upper end of the valve stem with an opening, a valve operating member extending through said opening and detachably secured to the valve stem, and electromagnetic means for actuating said valve operating member, said electromagnetic means including a controlling circuit having therein a timing device to maintain the electromagnetic means energized for a predetermined period after said means has been energized and for precluding re-energizing of said electromagnetic means for a predetermined time after it has been de-energized.

11. In an assembly of the character described, a milk delivery can having a body and a removable cover, the latter of which is provided therein with an opening, a tubular guide secured to the cover in registration with the opening and depending into the can, an agitation tube positioned upright in the can with its upper end guided for longitudinal movement in said tubular guide, and a seal normally closing said opening in the can cover.

12. A milk delivery can cover provided with a depending skirt adapted to extend into the interior of a can to mount the cover thereon, there being an opening in the cover adjacent the skirt, and a valve stem guide on the under side of the cover adjacent the skirt and in registration with the opening therein and rigidly secured to both the cover and the skirt.

13. In an assembly of the character described, a milk delivery can provided at the bottom thereof with a discharge outlet, a neck at the upper part of the can, a valve coacting with said discharge outlet and having a valve stem extending upwardly into the neck of the can, and a valve stem holder mounted upon and within the neck of the can.

14. In an assembly of the character described, a milk delivery can provided at the bottom thereof with a discharge outlet, a neck at the upper part of the can, a valve coacting with said discharge outlet and having a valve stem extending upwardly into the neck of the can, a valve stem holder mounted upon and within the neck of the can, a cover fitted upon the can and having an opening therein, and a valve stem guide registering with said opening and alined with the valve stem holder on the neck.

15. In an assembly of the character described, a milk delivery can provided at the bottom thereof with a discharge outlet, a neck at the upper part of the can, a valve coacting with said discharge outlet and having a valve stem extending upwardly itno the neck of the can, a valve stem holder mounted upon and within the neck of the can, a cover fitted upon the can and having an opening therein, and a valve stem guide registering with said opening, and cooperating means on the cover and on the can for registering said valve stem guide with said valve stem holder.

16. A liquid dispensing valve having a tubular valve stem with a vent opening therein, and a filler member detachably mounted within the valve stem and occupying the greater portion of the interior thereof to displace a corresponding volume of liquid which would otherwise enter the tubular valve stem through the vent opening therein.

17. In an assembly of the character described, a milk can having a body, a measuring receptacle at the bottom of the can provided with an outlet communicating with the exterior of the can, said measuring receptacle having a depending flange around the outlet thereof to guard the latter against injury, and a detachable seal normally secured to said flange to underlie the outlet of the measuring receptacle.

18. A liquid dispensing device comprising a tube provided with an open end adjacent which the wall of the tube has a vent opening, an elastic valve nipple extending into the open end of the tube and having a tubular cylindrical body, the wall of which is of less exterior diameter than the internal diameter of the tube, said tubular body being open at its outer end and closed at its inner end, the inner end having a thickened wall provided therein with a slit normally closed and the cylindrical wall of the body being sufficiently thin and elastic to expand against the interior of the tube and close the vent opening therein when sufficient air pressure is introduced into the tubular body to open the slit in the end wall thereof.

19. A milk delivery can provided at its bottom with a measuring receptacle having an inlet and outlet, valvular means for controlling said inlet and outlet, a tubular valve stem connected to the valve means for operating the same, said valve stem having vents through which the interior of the measuring receptacle may be vented, and a filler member detachably mounted within the valve stem and occupying the greater portion of the interior thereof to displace the corresponding volume of liquid which would otherwise enter the valve stem.

20. A milk dispenser comprising a suitable source of milk supply, a measuring receptacle connected thereto, valves for controlling the flow of milk from the source of supply into the measuring receptacle and out of the measuring receptacle to be dispensed therefrom, a valve operating member operatively connected to said valves, and electromagnetic means for actuating said valve operating member, said electromagnetic means including a controlling circuit having therein a timing device to maintain the electromagnetic means eenrgized for a predetermined period after said means has been energized and for precluding re-energizing of said electromagnetic means for a predetermined time after it has been de-energized.

WILLIAM TAMMINGA.